United States Patent
Lagarde et al.

(10) Patent No.: US 12,486,037 B2
(45) Date of Patent: Dec. 2, 2025

(54) METHOD FOR MANAGING OPERATION OF AN ELECTRICAL POWER SUPPLY SYSTEM OF AN AIRCRAFT COMPRISING AT LEAST ONE ELECTRICAL ENERGY STORAGE SET

(71) Applicant: THALES, Courbevoie (FR)

(72) Inventors: Alexandre Lagarde, Chatou (FR); Joël Devautour, Chatou (FR)

(73) Assignee: THALES, Courbevoie (FR)

(*) Notice: Subject to any disclaimer, the term of this patent is extended or adjusted under 35 U.S.C. 154(b) by 881 days.

(21) Appl. No.: 17/738,908

(22) Filed: May 6, 2022

(65) Prior Publication Data

US 2022/0399590 A1    Dec. 15, 2022

(30) Foreign Application Priority Data

May 7, 2021    (FR) ...................... 2104836

(51) Int. Cl.
*B64D 33/00*    (2006.01)

(52) U.S. Cl.
CPC .......... *B64D 33/00* (2013.01); *B64D 2221/00* (2013.01)

(58) Field of Classification Search
CPC ............. H01M 10/625; H01M 10/482; H01M 2220/20; B64D 33/00; B64D 2221/00; H02J 2310/44; H02J 1/002; H02J 7/14; H02J 7/34; H02J 3/32

See application file for complete search history.

(56) References Cited

U.S. PATENT DOCUMENTS

| | | | |
|---|---|---|---|
| 2015/0183385 A1 | 7/2015 | Iwashima et al. | |
| 2019/0393809 A1* | 12/2019 | Lacaux | H02J 3/38 |

FOREIGN PATENT DOCUMENTS

| | | |
|---|---|---|
| EP | 3 588 729 A1 | 1/2020 |
| FR | 2 911 698 A1 | 7/2008 |
| FR | 2 952 130 A1 | 5/2011 |
| FR | 2 976 558 A1 | 12/2012 |
| FR | 3 067 874 A1 | 12/2018 |

* cited by examiner

*Primary Examiner* — Julio C. Gonzalez
(74) *Attorney, Agent, or Firm* — Baker Hostetler

(57) ABSTRACT

A method for managing operation of an aircraft system comprising at least one electrical energy storage set to be supplied with DC current connected to a DC current power supply bus, at least one electrical machine providing AC current by mechanical draw on a drive system connected to a current generation control unit, a bidirectional converter configured to convert a DC voltage into AC voltage, and a control module of the converter, the management method generating a command for the converter from the angular position (θ) of the electrical machine, from the intensity of the electrical current delivered by the electrical machine, and from the output electrical voltage of the converter.

9 Claims, 5 Drawing Sheets

METHOD FOR MANAGING OPERATION OF AN ELECTRICAL POWER SUPPLY SYSTEM OF AN AIRCRAFT COMPRISING AT LEAST ONE ELECTRICAL ENERGY STORAGE SET

CROSS-REFERENCE TO RELATED APPLICATION

This application claims priority to foreign French patent application No. FR 2104836, filed on May 7, 2021, the disclosure of which is incorporated by reference in its entirety.

FIELD OF THE INVENTION

The invention relates to a method for managing operation of an electrical power supply system of an aircraft comprising at least one electrical energy storage set.

BACKGROUND

The aeronautical industry is faced with controversy in public opinion regarding global warming. Even though it represents only 3% of the global CO2 emissions, it is the very symbol of polluting transport. The aeronautical industry has a duty to put in place emission-reducing strategies as already implemented in road or maritime transport. Most of the emissions are linked to the propulsion, and therefore the consumption, of the jet engines. The aeronautical industry must find solutions that make it possible to reduce the emissions.

Also, on aeroplane jet engines, instabilities are observed in transient phases (accelerations, decelerations). These instabilities are emphasized by the significant electrical energy draw on the high-pressure stage of the jet engines.

One way of reducing emissions is to incorporate clean energies in the aeroplane distribution network, such as hydrogen. If hydrogen is used on an auxiliary generator, the aeroplanes must accept this additional source in parallel with the existing sources.

The management of the current energy sources implemented on aeroplanes with onboard variable-frequency HVAC network accepts only one source per subnetwork, prohibiting the smart distribution of loads between generators and leading to subnetwork power supply interruptions when switching over from one generator to another.

The electrical starting of the heat engines (jet engines or turboprop engines) is still not widely used and the electrical converters are used only during start-up. Despite the weight reduction of the air system traditionally used for start-up and the possibilities of restarting heat engines at altitude that are made possible, the weight of the electrical converters necessary to the implementation thereof, transported at all times, is a factor slowing down its use.

On the electrical energy generation systems of the aeroplanes, the voltage regulation of the onboard network is a critical function. Failure to perform this function potentially leading to an overvoltage that can be propagated to all the equipment makes this an event dreaded by aircraft manufacturers. The rise in power of these electrical energy generation systems, combined with the addition of the electrical start-up function of the aeroplane heat engines, leads to a very complicated management of these overvoltages. On recent aeroplanes, overvoltage management/protection systems have been necessary in order to be able to conform to the templates of the latest standards in force.

During aeroplane descent phases, the propulsion system is used to supply energy to the non-propulsive loads of the aircraft, such as the hydraulic and electrical systems. In this phase, the need for propulsive energy is very low. The thermal drive operates at very low power and in this case exhibits very low efficiencies, of the order of 10%. The supplying of the non-propulsive loads then consumes a lot of fuel for little power delivered.

With the development of batteries for energy storage on aircraft, allowing energy harvesting, a battery charge management system is necessary. In the case where the batteries have a high charge level, it is no longer possible to harvest energy, forcing energy dissipation systems to be maintained.

The reduction of emissions is currently obtained by the development of ultra-high bypass ratio jet engines, increasing the instability of the jet engines in certain phases of use.

To manage these instabilities, as illustrated by the document FR 3067874 which describes a solution allowing the load-shedding of ultra-high bypass ratio jet engines using an electrical generation supervisor member, the reactors are dimensioned with a margin that makes it possible not to enter into these instability zones. This margin causes the optimization of fuel consumption to be reduced. Thus, in the majority of flight phases, the jet engine is not used at its optimum operating point (optimum efficiency), reducing the anticipated emission saving.

SUMMARY OF THE INVENTION

One aim of the invention is to remedy the abovementioned problems.

According to one aspect of the invention, a method is proposed for managing operation of an electrical power supply system of an aircraft comprising at least one electrical energy storage set to be supplied with DC current connected to a DC current power supply bus, at least one electrical machine supplying AC current by mechanical draw on a drive system (such as a turbine or a turboprop or a gas turbine or a piston engine or a dynamic air turbine propeller) connected to a current generation control unit, a bidirectional converter configured to convert DC voltage into AC voltage, and a control module for the converter, the management method generating a command for the converter from the angular position of the electrical machine, from the intensity of the electrical current delivered by the electrical machine, and from the output electrical voltage of the converter, the elements of the system being connected by electrical connections. The generation of the command for the converter comprises the following steps:

breakdown of the electrical energy of the electrical current delivered by the electrical machine, into an active intensity of the electrical machine and a reactive intensity of the electrical machine;

limitation of the active intensity and of the reactive intensity such that the corresponding intensity of the electrical machine delivered by the electrical machine is lower than a threshold, by generation of a limitation setpoint of the active intensity and of a limitation setpoint of the reactive intensity;

management of rapid variation of the intensity of the electrical current delivered by the electrical machine, corresponding to variations of which the time constant is greater than the time constant of a transfer function of high-pass type, by generation of a variation setpoint of the active intensity and of a variation setpoint of the reactive intensity;

generation of a reactive intensity setpoint by the summation of the limitation setpoint of the reactive intensity and of the variation setpoint of the reactive intensity;

generation of an active intensity setpoint by the summation of the limitation setpoint of the active intensity and of the variation setpoint of the active intensity; and generation of a command for the converter from the active intensity setpoint, from the reactive intensity setpoint, from the angular position of the electrical machine, and from the output electrical voltage of the converter.

Such a method makes it possible to be able to deterministically drive the active and reactive power transfers between the AC electrical network, the energy storage and the generator comprising the electrical machine and the drive system. The method, by virtue of its precise management of the power flows, makes it possible to optimize the use of the electrical machine, of the converter and of the energy storage, and notably:

reduce the dimensioning of the electrical machine, by optimizing the active and reactive components of its load currents;

support the mechanical drive system in phases of instability by supplying the energy of the electrical network from the energy storage in order to stop and draw electrical energy on the mechanical drive system;

transmit power from the energy storage to the mechanical drive system in order to hybridize propulsion;

assist in the regulation of the network voltage over rapid load transients, facilitating observance of the templates of the aeronautical standards; assist in network voltage balancing;

allow electrical source transfers without power supply discontinuity; and assist in controlling the thermal state of the various components (electrical machine, electrical energy storage set, converter, etc.).

Such a method for generating the command for the converter makes it possible to dissociate the management of the active and reactive components of the electrical machine currents, making it possible to optimize the dimensioning of the electrical machine, which makes it possible to have a very deterministic behaviour of the converter in order to support the electrical network.

According to one implementation, the current limitation threshold of the electrical machine is constant if the temperature of the electrical machine is less than or equal to a threshold temperature from which the electrical machine can no longer operate at nominal power, and decreasing (for example linearly), between the threshold temperature and a maximum temperature supported by the electrical machine.

Thus, the current limitation makes it possible to support the electrical machine by limiting the power drawn on the electrical energy storage set to the minimum necessary as a function of the temperature of the electrical machine. That makes it possible to reduce the capacity of the electrical energy storage set, and will limit the use of the converter, improving its lifetime.

In one implementation, the active intensity setpoint also comprises the summation of a propulsion drive system support active intensity setpoint generated from a drive system support setpoint.

Thus, the converter and the storage system can be used to supply power in order to supply the electrical network, taking over the load from the electrical machine and therefore reducing the torque drawn on the drive system. The duly load-shed drive system will have more power available for the propulsion. This phenomenon will advantageously be able to be used to reduce the dimensioning of the drive system and therefore its weight.

The converter and the storage set can be used to supply power in order to supply the electrical network and drive the electrical machine. The electrical machine switches in this case from electrical generator to electric motor. The electric motor then assists the drive system in increasing its propulsion capacity, or assists it in restarting in the event of transients. This phenomenon can advantageously be used to reduce the dimensioning of the drive system and therefore its weight.

According to one implementation, the active intensity setpoint is assigned the value of a recharge intensity setpoint of the electrical energy storage set.

Thus, the converter can use the capacity of the electrical generator not used for the onboard network to recharge the energy storage set, the latter being reversible. The principle proposed has the advantage of leaving priority to the network support and drive system support functions, by recharging the energy reserve over periods during which no support is necessary.

In one implementation, said assignment takes place when the summation to generate the active intensity setpoint gives a zero value.

Thus, the energy storage set is recharged only if no demand to sustain active current (network or generator) is present.

According to one implementation, the recharge setpoint is generated from a recharge setpoint of the electrical energy storage set and/or from a level of charge of the electrical energy storage set.

Thus, in some cases, the control module can, on its own, decide on the recharge power level of the storage set as a function of its storage level, so it then acts as energy storage manager. In other cases, a higher-level control module may exist in the aircraft, and the converter then follows an external setpoint of this higher-level module for the recharging.

For example, the generation of the recharge setpoint is configured to demand a recharge when the level of charge is lower than a threshold.

In one implementation, the generation of the recharge setpoint depends on operating parameters of the electrical energy storage set, for example comprising the temperature of the electrical energy storage set.

Thus, after significant supports to the network or to the drive system, in addition to management of the energy of the storage set, the management of the converter advantageously makes it possible to be able to allow the equipment to cool by limiting the recharge level in order for them to be once again at full capacity from a thermal point of view as rapidly as possible.

According to another aspect of the invention, also proposed is a system for managing operation of an electrical power supply system of an aircraft comprising at least electrical energy storage set to be supplied with DC current connected to a DC current power supply bus, at least one electrical machine supplying AC current by mechanical draw on a drive system connected to a current generation control unit, a bidirectional converter configured to convert a DC voltage into AC voltage, and a control module of the converter configured to generate a command for the converter from the angular position of the electrical machine, from the intensity of the electrical current delivered by the electrical machine, and from the output electrical voltage of the converter.

According to one embodiment, the drive system comprises a turbine or a turboprop engine or a gas turbine or a piston engine or a dynamic air turbine propeller.

BRIEF DESCRIPTION OF THE DRAWINGS

The invention will be better understood on studying a few embodiments described as nonlimiting examples and illustrated by the attached drawings in which.

DETAILED DESCRIPTION

Figure 1:
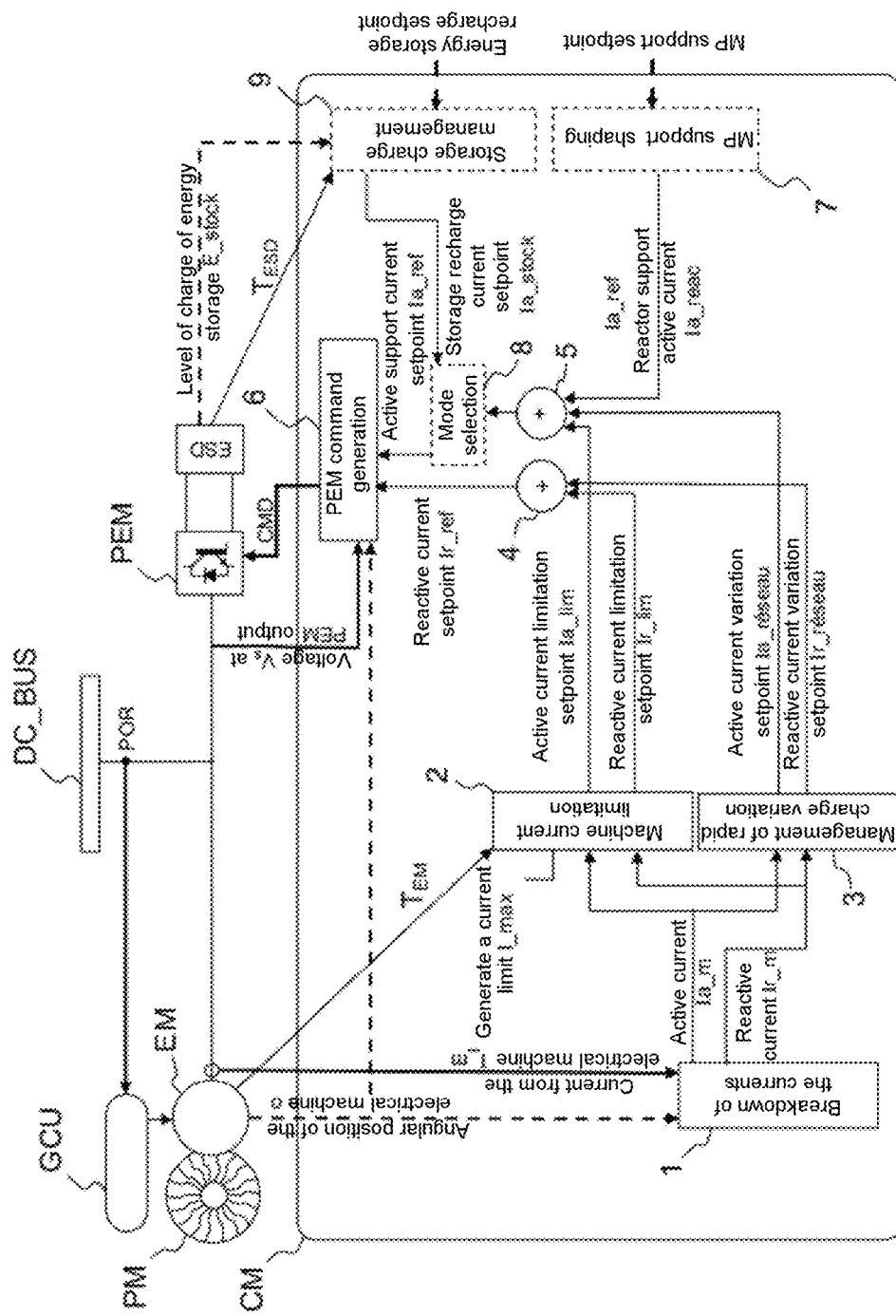
FIG. 1 schematically illustrates a method for managing operation of an electrical power supply system of an aircraft comprising at least one electrical energy storage set, according to one aspect of the invention.

FIG. 1 illustrates a method for managing operation of an electrical power supply system of an aircraft comprising at least one electrical energy storage set ESD to be supplied with AC current, according to one aspect of the invention.

In the examples described, the drive system represented is a propulsion engine PM (turbine or turboprop engine), but, as a variant, the invention applies equally to a gas turbine, a piston engine, a dynamic air turbine propeller.

The electrical energy storage set ESD can comprise at least one electrical battery, and/or at least one capacitor, and/or at least one supercapacitor, and/or at least one inertia wheel, and/or at least one fuel cell, and/or at least one standalone turbogenerator.

The electrical energy storage set ESD is connected to a DC current power supply bus DC_BUS.

The electrical power supply system comprises at least one electrical machine EM supplying AC current by mechanical draw on a propulsion engine PM connected to a current generation control unit GCU.

The electrical power supply system comprises an AC current converter PEM configured to reversibly convert a DC current from the electrical energy storage set ESD into AC current and a control module CM of the converter PEM. The various steps of the methods are implemented by the control module CM by software and/or hardware.

The method for managing the electrical power supply system generates a command for the converter PEM from the angular position θ of the electrical machine EM, from the intensity I_m of the electrical current delivered by the electrical machine EM, and from the output electrical voltage Vs of the converter PEM.

The generation of the command (CMD) for the converter (PEM) comprises the following steps:

breakdown 1 of the electrical intensity I_m of the electrical current delivered by the electrical machine EM, by means of the angular position θ of the electrical machine EM, into an active intensity Ia_m of the electrical machine ME and a reactive intensity Ir_m of the electrical machine ME;

limitation 2 of the active intensity Ia_m and of the reactive intensity Ir_m such that the corresponding intensity I_m of the electrical current delivered by the electrical machine EM is lower than a threshold I_max, by generation of a limitation setpoint Ia_lim of the active intensity Ia_m and of a limitation setpoint Ir_lim of the reactive intensity Ir_m;

management 3 of rapid variation of the intensity I_m of the electrical current delivered by the electrical machine EM, corresponding to variations of which the time constant is greater than the time constant of a transfer function of high-pass type, by generation of a variation setpoint Ia_réseau of the active intensity Ia_m and of a variation setpoint Ir reseau of the reactive intensity Ir_m;

generation 4 of a setpoint Ir_ref of reactive intensity Ir_m by summation of the limitation setpoint Ir_lim of the reactive intensity and of the variation setpoint Ir_réseau of the reactive intensity;

generation 5 of a setpoint Ia_ref of active intensity Ia_m by summation of the limitation setpoint Ia_lim of the active intensity and of the variation setpoint Ia_réseau of the active intensity; and generation 6 of a command for the converter PEM from the setpoint Ia_ref of active intensity, from the setpoint Ir_ref of reactive intensity, from the angular position θ of the electrical machine EM, and from the output electrical voltage of the converter PEM.

The breakdown 1 of the currents analyses machine currents and calculates the active and reactive components thereof using the angular position of the machine. The angular position will be able to be either measured or estimated directly by the control module CM. Knowing the angle of the machine and its three currents, the currents can be broken down mathematically between an active component and a reactive component by the dqo transformation:

A dqo transform corresponds to:

$$Id = \text{root}(\tfrac{2}{3})*(\cos(\text{Theta})*ia + \cos(\text{Theta}-2*\text{pi}(\ )/3)*ib + \cos(\text{Theta}+2*\text{pi}(\ )/3)*ic)$$

$$Iq = \text{root}(\tfrac{2}{3})*(\sin(\text{Theta})*ia + \sin(\text{Theta}-2*\text{pi}(\ )/3)*ib + \sin(\text{Theta}+2*\text{pi}(\ )3)*ic)$$

$$Io = \text{root}(\tfrac{2}{3})*(\text{root}(2)/2*ia + \text{root}(2)/2*ib + \text{root}(2)/2*ic)$$

Ia, Ib and Ic being the three instantaneous machine currents

Theta being the angular position of the machine

Id being the current of axis d of the electrical machine, corresponding to the reactive current Iq being the current of axis q of the electrical machine, corresponding to the active current Io being the homopolar current of the machine The limitation 2 makes it possible to ensure that the current of the electrical machine EM is lower than the maximum current authorized by thermal or mechanical design of the electrical machine EM. When the latter exceeds the maximum level, for example the nominal current of the electrical machine EM, a current injection setpoint is sent to the converter PEM. The PEM then injects a current making it possible to keep the real current of the electrical machine EM at its allowable maximum. The limitation 2 makes it possible to be able to limit the machine current by prioritizing either the active current or the reactive current.

One advantageous example of application consists in prioritizing the limitation of the current of the electrical machine EM by the reactive current; the converter PEM does not discharge the electrical energy storage set ESD—only the active current discharges the electrical energy storage set ESD.

Another advantageous example consists of the possibility of choosing the type of support, active or reactive, as a function of the level of charge of the electrical current storage set ESD in order to keep the reserve at the maximum and optimize the dimensioning thereof.

The management 3 analyses the rapid variations of the current of the electrical machine EM, for example less than 2.5 ms, and smooths the load by injecting or drawing current by the converter PEM. Depending on the type of current, active or reactive, the management 3 acts on the current having the best effect on the smoothing of the load and its impact on the voltage variations of the network. A so-called high-pass transfer function is applied, which makes it possible to harvest only the vibrations of which the time constant is greater than that of the transfer function.

The command generation for the converter PEM uses the active current and reactive current setpoints in the reference frame of the electrical machine, known by virtue of its angular position, to drive the power interruptions by a pulse width modulation. This angular position can be known either by measurement, or by estimation from the measured currents of the electrical machine EM and from the output voltage of the PEM.

The active intensity setpoint Ia_ref can also comprise the summation 5 of a propulsion engine support active intensity setpoint Ia_reac generated 7 from a propulsion engine support setpoint PM.

It is possible to assign 8, by mode selection, to the active intensity setpoint Ia_ref the value of a recharge intensity setpoint Ia_stock of the electrical energy storage set ESD, for example when the summation to generate the active intensity setpoint Ia_ref gives a zero value.

This mode selection 8 makes it possible to prioritize the supports (propulsion engine PM support, current limitation, variation management) with respect to the recharging of the electrical energy storage set ESD. The supports are generally of short duration (<10 s) and the charges of longer duration (>a minute). The recharging is done when no support is necessary (>90% of the time). This mode assignment or selection 8 ensures that, as soon as active current support is necessary, it takes priority over the recharging of the electrical energy storage set ESD.

The recharge setpoint Ia_stock can be generated 9 from a recharge setpoint of the electrical energy storage set ESD and/or from a level of charge E_stock of the electrical energy storage set ESD.

The energy storage charge management 9 of the electrical energy storage set ESD ensures that the energy reserve necessary for the various supports remains at a sufficient level of charge. A storage recharge is requested if the energy level is lower than a predefined threshold, or than an optimum level of charge at any moment as a function of the state of the system (level of charge, temperature, etc.). Alternatively, it is possible to retransmit the request from a more global energy management system if the reserve is used also for external functions. Alternatively, for storage systems of complex technologies, it is possible to retransmit the request from a storage management system (such as a BMS—battery management system—for lithium-ion batteries).

The present invention therefore makes it possible to efficiently manage the cases described by the following figures.

Figure 2:
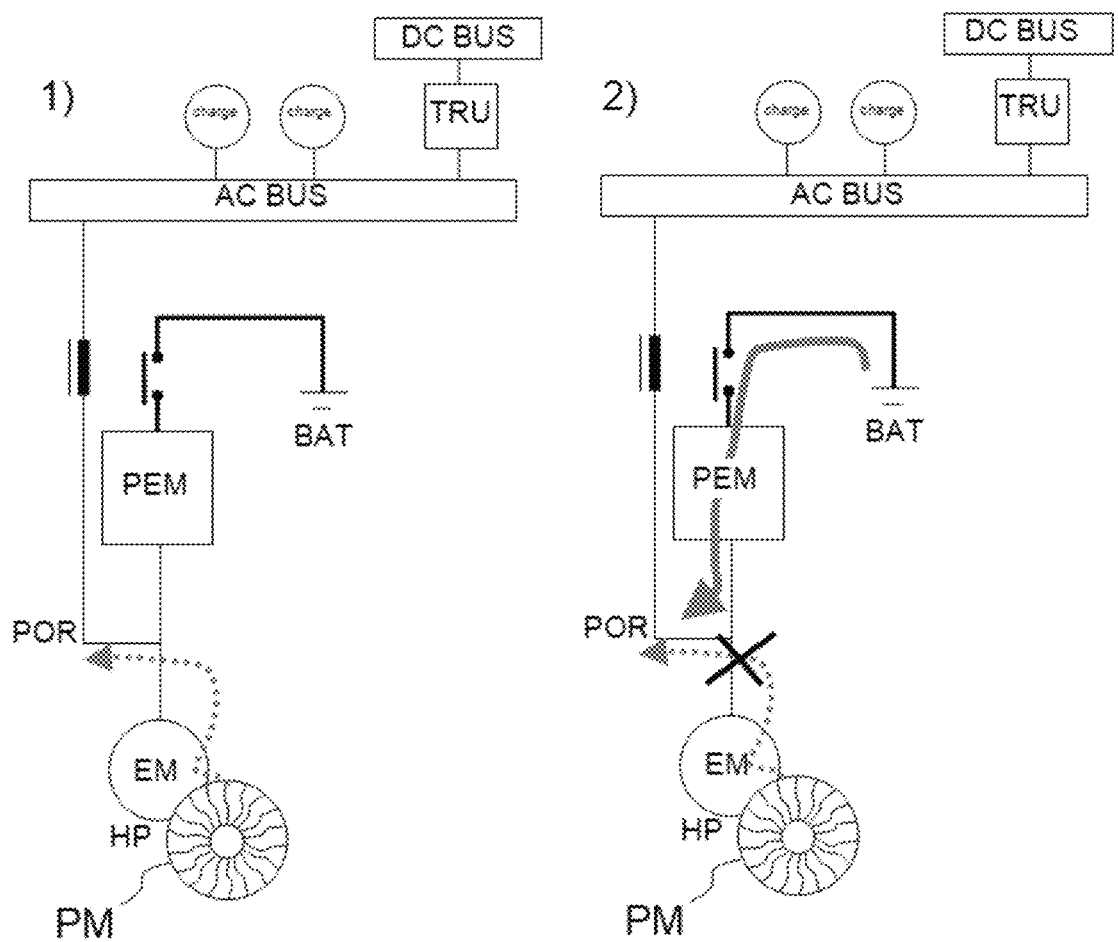
FIG. 2 schematically illustrates an example of use of the method of FIG. 1, according to one aspect of the invention.

FIG. 2 illustrates the use of the invention to support the electrical network of an aeroplane to shed the load of the propulsion engine PM, leading to a reduction of the peak power necessary for the propulsion engine PM, reducing the power margin requirement, and contributing to increasing its overall efficiency over a flight.

The electrical energy storage set ESD can be charged before take-off with the energy necessary to ensure the function or functions. Alternatively, the electrical energy storage set ESD can be recharged during the flight in cruising phase, a phase during which the propulsion engines PM are used with optimized efficiency.

In normal operation, the total electrical power necessary for the charges is drawn on the propulsion engine PM by the electrical machine EM used as generator. In certain flight phases, the aeroplane can demand of the propulsion engine PM an abrupt thrust variation, or high thrust levels bringing the propulsion engine PM to the limit of its stability zone.

In these phases, a member external to our system (FADEC, the acronym for "Full Authority Digital Engine Control", or an external computer) can demand an input of external electrical power in order to limit the draw on the propulsion engine PM. The converter system PEM and the electrical machine EM ensure the transfer from one source to the other automatically, without transition and interruption of power supply of the electrical network.

The proposed solution makes it possible to be able to switch from one mode to the other naturally, without interrupting the network power supply (case 1 to case 2).

The distribution of the power input from the PEM can then be driven by the network voltage. The electrical generation control unit, or GCU (generator control unit), these days regulates the network voltage to the POR. An external member gives a power setpoint to the PEM; the PEM tries to increase the voltage to the point of regulation, or POR, to reach the demanded power. It operates as a current source. The reaction of the GCU is an action to maintain the voltage and naturally reduce the contribution of the electrical machine EM.

At a certain point, the electrical machine EM no longer supplies power, and the electromotive force EMF of the electrical machine EM is equal to the output voltage of the converter PEM.

It should be noted that, in all cases, it is the electrical machine EM which imposes the frequency; the converter PEM is only a current source following the voltage of the electrical machine EM.

Another use can allow the converter PEM and the electrical energy storage set ESD to supply the electrical network of the aeroplane in phases during which the propulsion is used at low power (descent phase of an aeroplane for example).

Typically in descent phases, when the efficiency of the propulsion engine PM is very low, the proposed configuration makes it possible to supply the electrical energy by taking energy from the electrical energy storage set ESD, reducing the CO2 emissions of the aeroplane.

Figure 3:
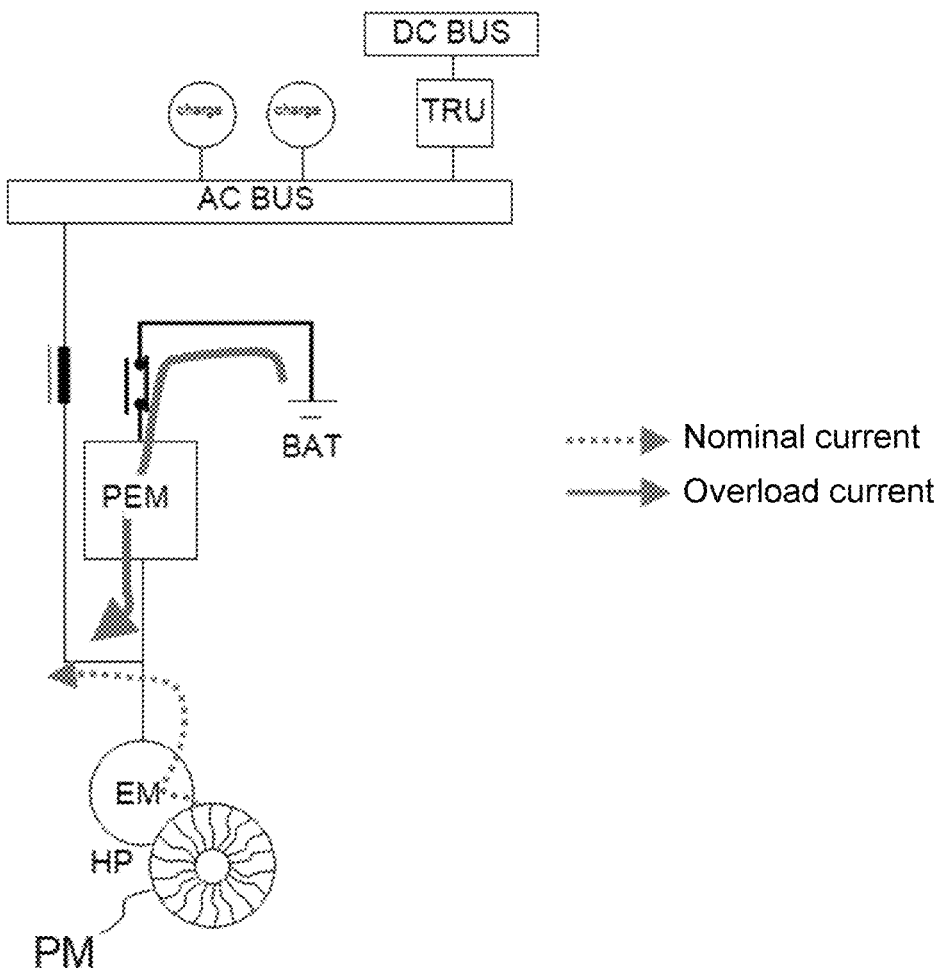
FIG. 3 schematically illustrates an example of use of the method of FIG. 1, according to one aspect of the invention.

FIG. 3 illustrates the use of the invention to support the network to reduce the dimensioning of the electrical machine EM.

The electrical machine EM is dimensioned to supply temporary overloads, typically 1.25 In (In representing the nominal current) for 5 minutes, and 1.7 In for 5 seconds. It must also contribute to the selectivity of the protections and provide one of the short-circuit currents, typically of 2.5 In for 5 s.

The converter PEM and the electrical energy storage set ESD can supply the temporary overloads, making it possible to dimension the electrical machine EM only on the nominal power.

The regulation of the converter PEM ensures that the electrical machine EM has a current lower than a defined limit, supplying the supplement to ensure that the requirements of the loads are covered and ensure the selectivity of the protections.

FIG. 3 illustrates the electrical machine EM limited to its nominal current, with the supplement supplied by the converter PEM.

In the example of FIG. 3, the electrical machine EM can be dimensioned only on the nominal requirement, making it possible to reduce its weight, its size and its cost.

Since the nominal power of an auxiliary power unit APU is defined in combinations of failure modes, it is accepted that the electrical energy storage set ESD can supply power in certain failure modes; the electrical machine EM could even be dimensioned below the nominal power defined according to the current state of the art, further increasing the potential weight, volume and cost savings of the electrical machine EM.

Figure 4:
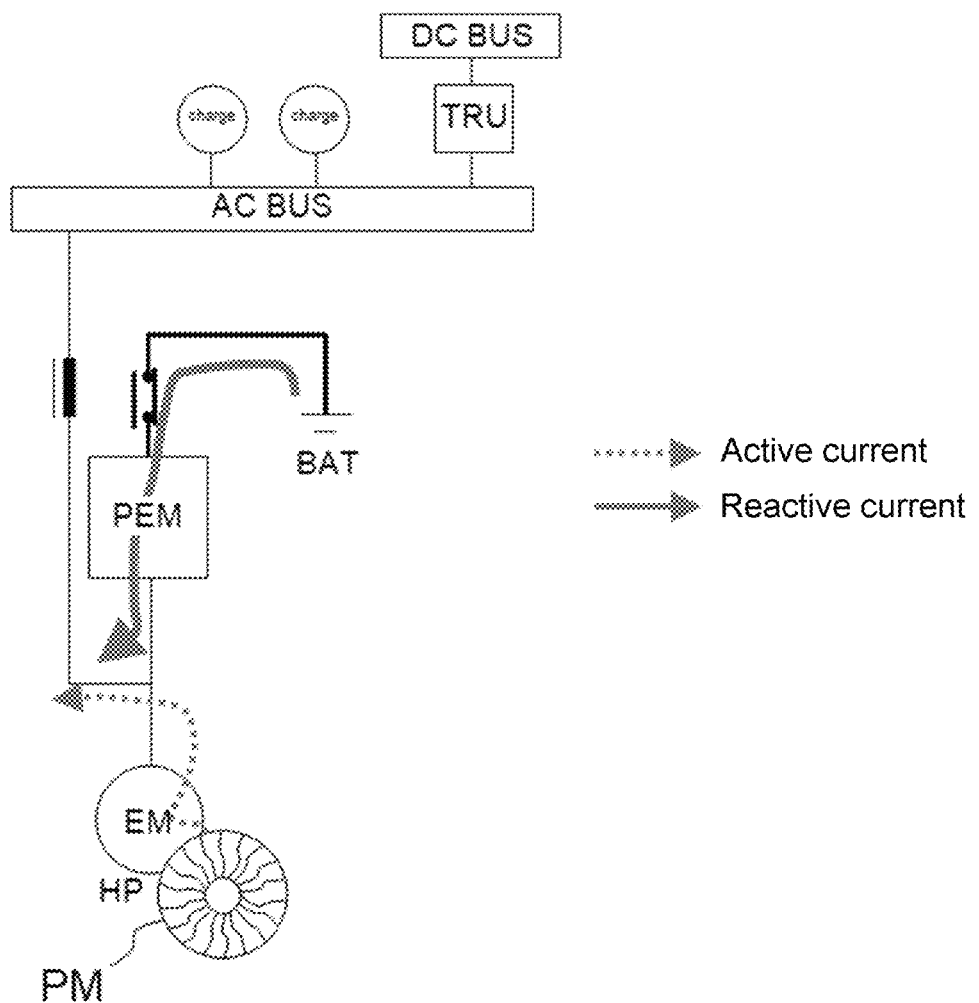
FIG. 4 schematically illustrates an example of use of the method of FIG. 1, according to one aspect of the invention.

FIG. 4 illustrates a reduction of the dimensioning of the electrical machine EM through the supply of the reactive current by the converter PEM. In fact, the reactive current of the machine impacts the dimensioning thereof, creates losses, but adds no added value to the system. In addition, the supply of reactive current by the PEM consumes almost no energy on the energy storage.

The electrical machine EM is dimensioned to supply the active power and the reactive power consumed by the loads. The power factor demanded by the aircraft manufacturers is generally between 0.75 and 0.85%.

In FIG. 4, the electrical machine EM supplies only the nominal active current. The reactive current is supplied by the converter PEM.

The converter PEM can supply the reactive power, making it possible to dimension the electrical machine EM only on the active power, which allows for a reduction of weight of the electrical machine EM of the order of 10 to 20%.

In a driving alternative minimizing the dimensioning of the converter PEM, the latter supplies reactive current support only if the total current of the electrical machine EM (active+reactive) exceeds the nominal current of the electrical machine EM. The converter PEM then operates as a current limiter for the machine EM, with priority to the reactive current support. If the active current alone becomes greater than the nominal current of the electrical machine EM, then the converter PEM supplies also active current.

Figure 5:
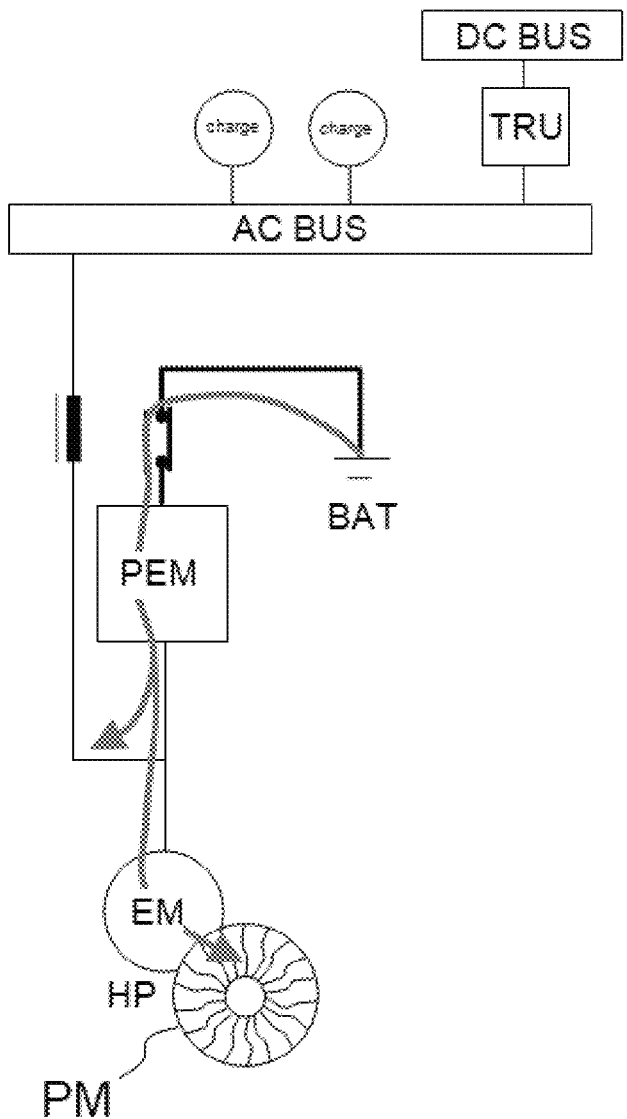
FIG. 5 schematically illustrates an example of use of the method of FIG. 1, according to one aspect of the invention.

FIG. 5 illustrates assistance to the propulsion engine PM over transient phases, leading to a reduction of the peak power necessary for the thermal drive, reducing the power margin requirement, and contributing to reducing the dimensioning of the propulsion engine PM and to increasing its overall efficiency on the mission profiles.

At the demand of the FADEC, the energy reserve can, among other things, be used to assist the propulsion engine PM.

If the power input demand is greater than the consumption of the electrical network, the electrical power originating from the electrical energy storage set ESD will automatically be transferred partly to the electrical machine EM which switches over to motor mode. The electrical machine EM then drives the drive system. The power of the electrical machine EM is much lower than the power of the drive system necessary to propel the aircraft, and will merely be a supplement. In this case, the expression "electrical assistance" to the propulsion system is used.

By virtue of the proposal, the transition to this mode can be continuous, without interruption of the power supply of the electrical network. This mode will also be able to be used when the aeroplane is in descent phase. In descent phase, the propulsion engine PM can be in different modes: blades folded back, blades oriented in the direction of the air stream, transparent mode or turbine mode. The mode most commonly used and improving the energy consumption in descent is the transparent mode. In this mode of operation, the propulsion engine PM is driven at a speed for which the propulsive power becomes zero. The propulsion unit is then used to cancel the drag of the jet engine. Although it is the most economical mode, it is still the thermal energy of the propulsion engine PM which is used at very low powers. At low power, the efficiency of the propulsion drive is particularly low, of the order of 10%.

The invention makes it possible to drive the propulsion engine PM in descent by the electrical machine EM to ensure transparency and supply all the non-propulsive energy consumption using the energy stored in the electrical energy storage set ESD.

The present invention further makes it possible to regulate the voltage of the electrical network. In rapid transients, it is often difficult to keep the output voltages of the electrical machine EM, used in this case as generator, within the values authorized by the aircraft manufacturer electrical network standards. This observation is all the more true for the electrical machines EM, used as generator, including the start-up function which require high impedances. The proposed system can assist the current generation control unit GCU ("Generator Controller Unit"), to control the electrical voltage to the level of the point of regulation POR.

The converter PEM follows the voltage of the electrical network with a time constant defined by the regulation thereof, rather slow with respect to the load-shedding phenomena. In the event of very rapid load sheddings, the converter PEM tries to temporarily maintain the voltage and naturally supplies a current stabilizing the voltage of the network. More gradually, its regulations tend to align the supply of current of the converter PEM on its support or recharge setpoints, leaving the regulator GCU of the electrical machine to take over and adapt the supply of power by the electrical machine EM to the requirement of the network.

The regulation of the electrical machine EM is facilitated, and the addition of additional components to manage the overvoltages can be avoided.

The invention claimed is:

1. A method for managing operation of an aircraft system comprising at least one electrical energy storage set (ESD) to be supplied with DC current connected to a DC current power supply bus (DC_BUS), at least one electrical machine (EM) supplying AC current by mechanical draw on a drive system connected to a current generation control unit (GCU), a bidirectional converter (PEM) configured to convert DC voltage into AC voltage, and a control module (CM) for the converter (PEM), the management method generating a command (CMD) for the converter (PEM) from the angular position ($\theta$) of the electrical machine (EM), from the intensity (I_m) of the electrical current delivered by the electrical machine (EM), and from the output electrical voltage (Vs) of the converter (PEM), the elements of the system being connected by electrical connections, the generation of the command (CMD) for the converter (PEM) comprises the following steps:
breakdown of the electrical intensity (I_m) of the electrical current delivered by the electrical machine (EM), into an active intensity (Ia_m) of the electrical machine (ME) and a reactive intensity (Ir_m) of the electrical machine (ME);

limitation of the active intensity (Ia_m) and of the reactive intensity (Ir_m) such that the corresponding intensity (I_m) of the electrical current delivered by the electrical machine (EM) is lower than a threshold (I_max), by generation of a limitation setpoint (Ia_lim) of the active intensity (Ia_m) and of a limitation setpoint (Ir_lim) of the reactive intensity (Ir_m);

management of rapid variation of the intensity (I_m) of the electrical current delivered by the electrical machine (EM), corresponding to variations of which the time constant is greater than the time constant of a transfer function of high-pass type, by generation of a variation setpoint (Ia_réseau) of the active intensity (Ia_m) and of a variation setpoint reseau) of the reactive intensity (Ir_m);

generation of a reactive intensity (Ir_m) setpoint (Ir_ref) by the summation of the limitation setpoint (Ir_lim) of the reactive intensity and of the variation setpoint (Ir_réseau) of the reactive intensity;

generation of an active intensity (Ia_m) setpoint (Ia_ref) by the summation of the limitation setpoint (Ia_lim) of the active intensity and of the variation setpoint (Ia_réseau) of the active intensity; and generation of a command for the converter (PEM) from the active intensity setpoint (Ia_ref), from the reactive intensity setpoint (Ir_ref), from the angular position (θ) of the electrical machine (EM), and from the output electrical voltage of the converter (PEM).

2. The method according to claim 1, wherein the threshold (I_max) is constant (I_max0) if the temperature ($T_{EM}$) of the electrical machine (EM) is less than or equal to a threshold temperature (Ta) from which the electrical machine (EM) can no longer operate at nominal power, and decreasing between the threshold temperature (Ta) and a maximum temperature (Tmax) supported by the electrical machine (EM).

3. The method according to claim 1, wherein the active intensity setpoint (Ia_ref) also comprises the summation of a drive system support active intensity setpoint (Ia_reac) generated from a drive system support setpoint.

4. The method according to claim 1, wherein the active intensity setpoint (Ia_ref) is assigned the value of a recharge intensity setpoint (Ia_stock) of the electrical energy storage set (ESD).

5. The method according to claim 4, wherein said assignment takes place when the summation to generate the active intensity setpoint (Ia_ref) gives a zero value.

6. The method according to claim 4, wherein the recharge setpoint (Ia_stock) is generated from a recharge setpoint of the electrical energy storage set (ESD) and/or from a level of charge (E_stock) of the electrical energy storage set (ESD).

7. The method according to claim 6, wherein the generation of the recharge setpoint (Ia_stock) is configured to request a recharge when the level of charge (E_stock) is lower than a threshold.

8. The method according to claim 4, wherein the generation of the recharge setpoint (Ia_stock) depends on operating parameters of the electrical energy storage set (ESD).

9. The method according to claim 8, wherein said operating parameters comprise the temperature ($T_{ESD}$) of the electrical energy storage set (ESD).

* * * * *